United States Patent [19]

Ottens

[11] Patent Number: 5,063,701
[45] Date of Patent: Nov. 12, 1991

[54] FISHING ROD HOLDING ATTACHMENT FOR COLLAPSIBLE CHAIR

[76] Inventor: John O. Ottens, 420 Forest, Crete, Nebr. 68333

[21] Appl. No.: 622,749

[22] Filed: Dec. 5, 1990

[51] Int. Cl.⁵ ............................................ A01K 97/10
[52] U.S. Cl. .................................... 43/21.2; 248/520; 248/528
[58] Field of Search ................. 43/21.2; 248/520, 528, 248/538, 464, 513

[56] References Cited

U.S. PATENT DOCUMENTS

| | | | |
|---|---|---|---|
| 3,327,978 | 6/1967 | Gates | 43/21.2 |
| 3,546,805 | 12/1970 | Schaeffer | 43/21.2 |
| 3,701,504 | 10/1972 | Woods et al. | 248/520 |
| 4,133,131 | 1/1979 | Davy | 248/528 |
| 4,159,816 | 7/1979 | Miyamae | 43/21.2 |
| 4,550,520 | 11/1985 | Bogue | 43/21.2 |

FOREIGN PATENT DOCUMENTS

| | | | |
|---|---|---|---|
| 2133943 | 1/1973 | Fed. Rep. of Germany | 43/21.2 |
| 2576487 | 8/1986 | France | 43/21.2 |

*Primary Examiner*—Richard K. Seidel
*Assistant Examiner*—Edward A. Brown
*Attorney, Agent, or Firm*—Zarley, McKee, Thomte, Voorhees & Sease

[57] ABSTRACT

A fishing rod holder includes a generally U-shaped frame having right and left legs and a base leg connected between the right and left legs. A U-shaped support frame is operably connected to the legs of the first frame so that the support frame will pivot about an axis extending between the connecting points of the support frame to the first frame. A rod retention plate is connected between the legs of the first frame and includes a pair of elastic bands which are stretchable to form loops to frictionally hold the handle of a fishing rod. A pair of guide members are connected to the base leg of the first frame to retain an upper portion of the rod when the rod is retained by the elastic band. An extensible arm extends between the base leg on the first frame and the base leg of the U-shaped support frame, so as to selectively stop the pivotal movement of the support frame to prop the first frame at the desired angle. A pair of clamps on the free ends of the first frame are designed to clamp to the front legs of a collapsible chair to retain the fish holding apparatus in relation to the chair.

7 Claims, 3 Drawing Sheets

FISHING ROD HOLDING ATTACHMENT FOR COLLAPSIBLE CHAIR

TECHNICAL FIELD

The present invention relates generally to chairs which are collapsible, and more particularly to a rod holding attachment which is attachable to a fishing chair and which is collapsible itself such that the chair and attachment are easily transportable.

BACKGROUND OF THE INVENTION

Because of the amount of time an avid fisherman spends "waiting" for the prey, it is typical for the fisherman to bring along a chair of some sort to rest in. Such chairs have taken on many forms, but typically comprise a collapsible lawn chair or the like.

In addition to a lawn chair, it is common for the fisherman to utilize a rod holder of some type fashioned to hold the rod during these waiting periods.

The major problem with the existing method for fishing is in the cumbersome carrying of a lawn chair, fishing rod and fishing tackle from a vehicle to the desired fishing position. Typically it was necessary to carry the chair separately from the rod, fishing tackle and any other comforts which the fisherman desired to bring along.

It is therefore a general object of the present invention to provide a combination fishing chair and rod holder which is collapsible for easy transportability. Another object of the present invention is to provide a fishing rod holder which is attachable to various types of fishing chairs.

A further object is to provide a fishing rod holder which is collapsible for easy transportability along with the chair.

Yet another object of the present invention is to provide a fishing rod holder attachment which will support a fishing rod for fishing or for transport.

Still another object of the present invention is to provide a fishing rod holder with storage capability for the storage of fishing tackle of the like.

Another object of the present invention is to provide a fishing rod holder attachable to a fishing chair which is simple to operate, economical to manufacture and refined in appearance.

These and other objects will be apparent to those skilled in the art.

SUMMARY OF THE INVENTION

The fishing rod holder attachment of the present invention includes a generally U-shaped frame having right and left legs and a base leg connected between the right and left legs. A U-shaped support frame is operably connected to the legs of the first frame so that the support frame will pivot about an axis extending between the connecting points of the support frame to the first frame. A rod retention plate is connected between the legs of the first frame and includes a pair of elastic bands which are stretchable to form loops to frictionally hold the handle of a fishing rod. A pair of guide members are connected to the base leg of the first frame to retain an upper portion of the rod when the rod is retained by the elastic band. An extensible arm extends between the base leg on the first frame and the base leg of the U-shaped support frame, so as to selectively stop the pivotal movement of the support frame to prop the first frame at the desired angle. A pair of clamps on the free ends of the first frame are designed to clamp to the front legs of a collapsible chair to retain the fish holding apparatus in relation to the chair.

DESCRIPTION OF THE PREFERRED EMBODIMENT

Figure 1:
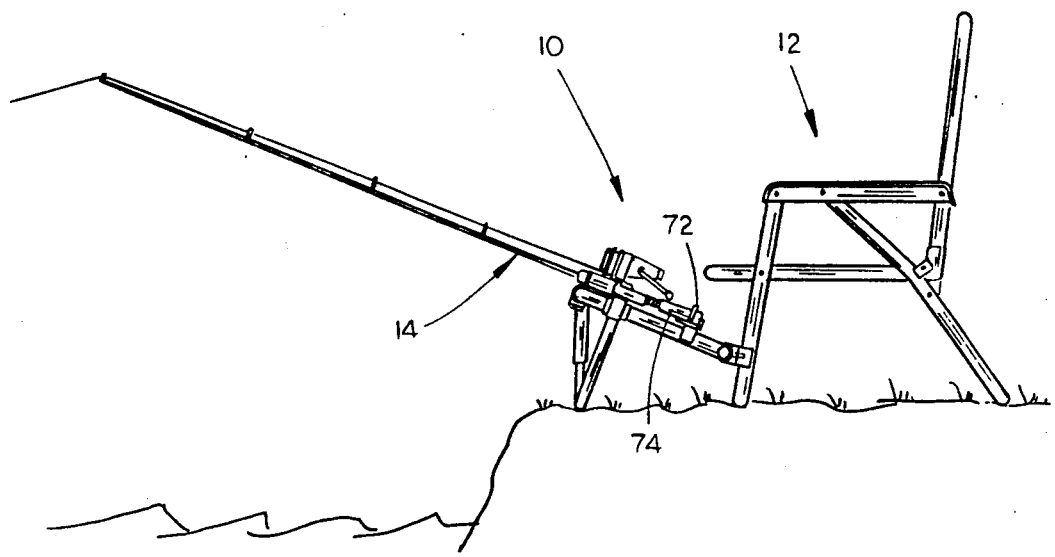
FIG. 1 is a side elevational view of the fishing rod holder attachment and fishing chair of the present invention in use.

Referring now to the drawings, in which similar or corresponding parts are identified with the same reference numeral, and more particularly to FIG. 1, the fishing rod holder of the present invention is designated generally at 10 and is shown in use connected to a collapsible lawn chair 12, with a fishing rod 14 installed on the fishing rod holder oriented for fishing.

Figure 2:
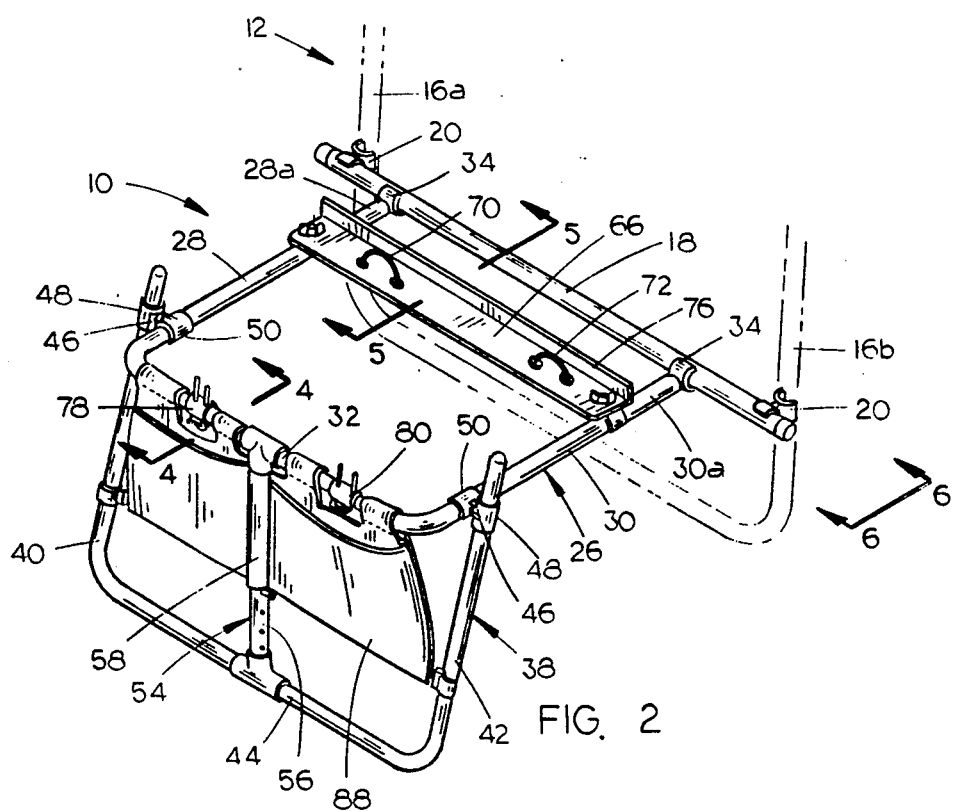
FIG. 2 is a perspective view of the fishing rod holder of the present invention.
Figure 6:
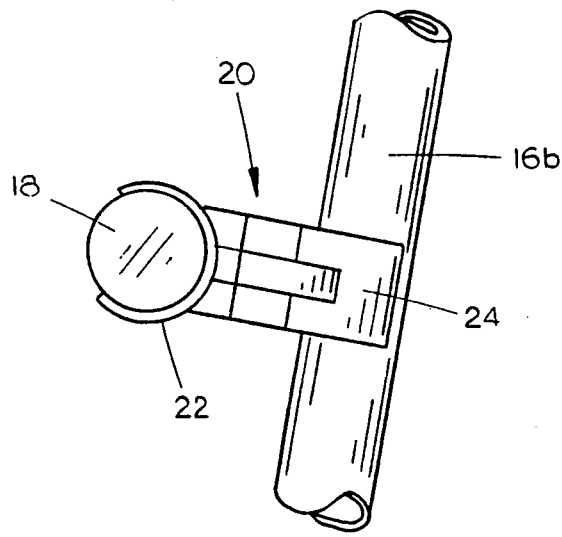
FIG. 6 is a partial elevational view taken at lines 6—6 in FIG. 2.

Referring now to FIG. 2, the forward right and left legs 16a and 16b, respectively, of lawn chair 12 are shown in broken lines. Typically, lawn chair 12 is formed with legs 16 of tubular metal, such as aluminum. Fishing rod holder 10 includes a generally horizontally oriented elongated attachment bar 18 having adjustable clamping brackets 20 attached at opposite ends. Clamping brackets 20 are each formed of a pair of opposing arcuate resilient plastic clamps which will frictionally grip both the attachment bar 18 and legs 16a and 16b of chair 12, in a conventional fashion. As shown in FIG. 6, clamping bracket 20 has a forward facing clamp portion 22 with the arcuate plastic clamp portion having an inner diameter substantially the same as the diameter of attachment bar 18. The rearward facing clamp portion 24 has an inner diameter substantially the same as the diameter of the lawn chair legs. Thus, clamp portions 22 and 24 will snap fit on attachment bar 18 and the lawn chair legs. This snap fit also permits adjustment of clamp brackets 20 vertically with respect to lawn chairs 16a and 16b, and horizontally with respect to attachment bar 18 so as to fit various lawn chairs having different distances between forward legs 16a and 16b.

Figure 3:
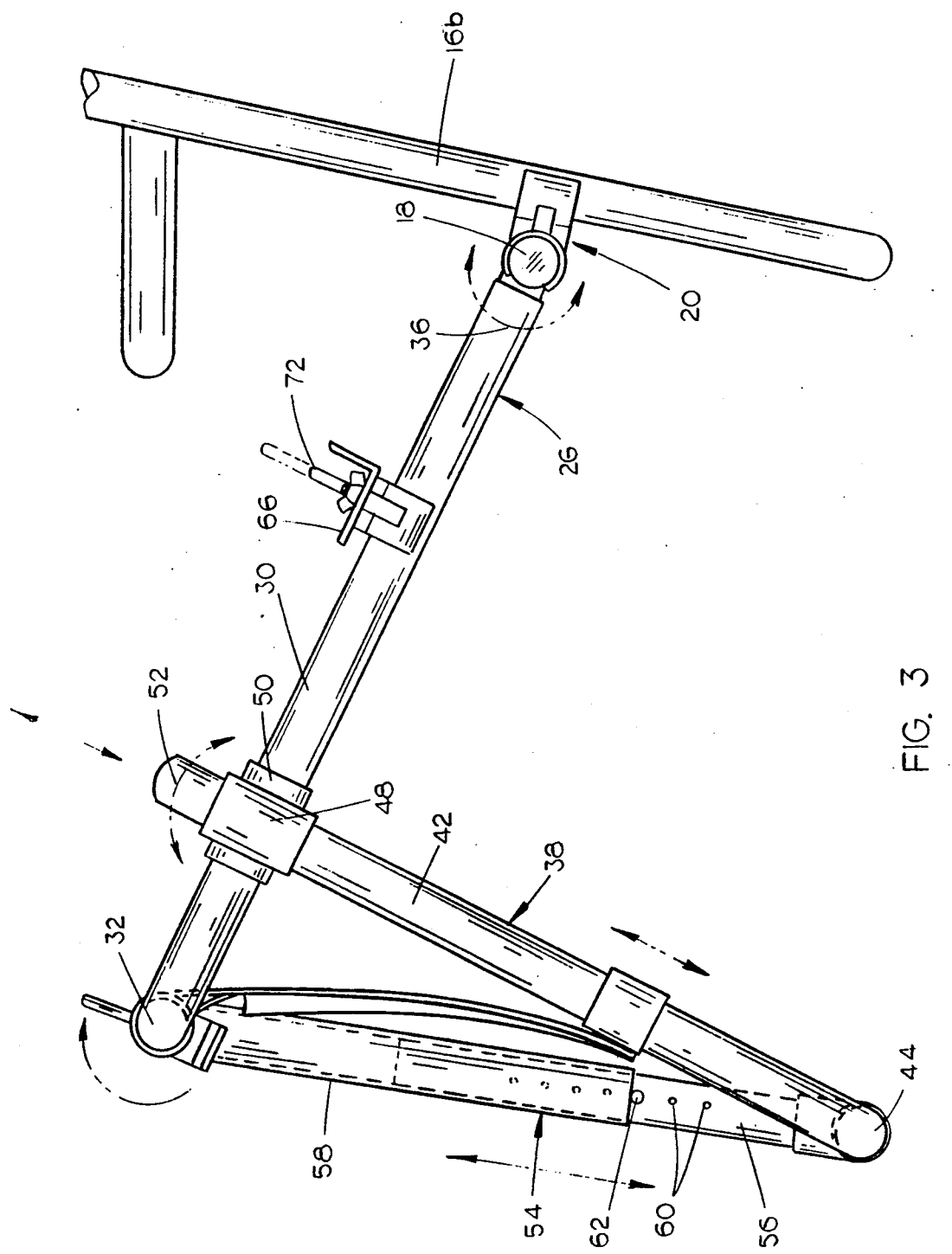
FIG. 3 is a side elevational view of the fishing rod holder.

Fishing rod holder 10 includes a generally U-shaped frame 26 including right and left legs 28 and 30 and base portion 32 connecting the forward ends of legs 28 and 30. The rearward free ends 28a and 30a of legs 28 and 30 are pivotally and removably connected to attachment bar 18 utilizing resilient clamps 34. Clamps 34 are similar to clamp portions 22 and 24 of clamping brackets 20 and will snap fit on attachment bar 18 such that frame 26 may be pivoted about attachment bar 18 as shown in FIG. 3 by arrow 36.

A U-shaped support frame 38 includes right and left legs 40 and 42 and a base leg 44 connected between the lower ends of legs 40 and 42. The upper free ends of legs 40 and 42 are operably connected to legs 28 and 30 of frame 26 utilizing operable resilient clamps 46. Operable clamps 26 include a resilient clamp portion 48 which is adjustably connected to the legs of support frame 38, and a resilient clamp portion 50 which is adjustably connected to the legs of frame 26. The clamp portions 48 and 50 are rotatably connected such that support frame 38 may be rotated about an axis extending between operable clamps 46, generally parallel to base leg 32 of support frame 26, as shown by arrow 52 in FIG. 3. Operable clamps 48 and 50 are also resilient, so as to permit adjustable connection to their respective legs.

Figure 7:
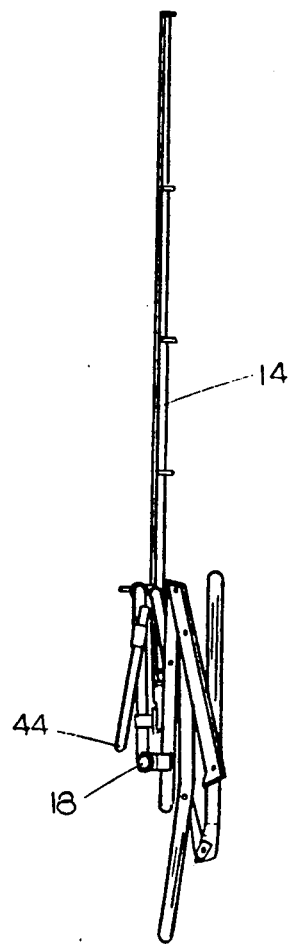
FIG. 7 is a side elevational view of the chair and rod holder collapsed for transportability.

An extensible arm 54 is pivotally connected at one end to base leg 44 of support frame 38, and pivotally connected at its other end to base leg 32 of frame 26, as shown in FIG. 2. Extensible arm 54 includes a lower tubular portion 56 which telescopically slides within an upper tubular sleeve 58, as shown in FIG. 3. A plurality of apertures 60 are formed in lower portion 56 and spaced apart, so as to receive a selectively removable stop pin 62. In this way, support frame 38 may be pivoted rearwardly (with base leg 44 moved towards and adjacent to attachment bar 18, as shown in FIG. 7). During this movement, the distance between base leg 44 of support frame 38 and base leg 32 of frame 26 will increase, and lower portion 56 will slide out of upper sleeve 58. On the other hand, when base leg 44 of support frame 38 is moved away from attachment bar 18, so as to set up fishing rod holder 10, lower portion 56 of extensible arm 54 will slide into sleeve 58 until sleeve 58 reaches stop pin 62. Stop pin 62 may be inserted in any of apertures 60 to permit the desired amount of rotatable movement of support frame 38 with respect to frame 26.

A rod support plate 66 is adjustably connected between legs 28 and 30 on frame 26, as shown in FIG. 2. Fishing rod support plate 66 is connected to legs 28 and 30 utilizing resilient clamps 68. A pair of elastic bands 70 and 72 are connected to the upper surface of support plate 66 so as to form stretchable loops. In this way, a band 72 may be stretched upwardly so that the handle 74 of a fishing rod 14 may be inserted within the loop. The elasticity of band 72 will then retain the rod handle in place, as shown in FIG. 1. A second fishing rod (not shown) may be inserted in band 70 in a similar fashion. An upstanding lip 76 formed along the rearward of plate 66 prevents fishing rod 14 from sliding back towards the chair 12.

Figure 4:
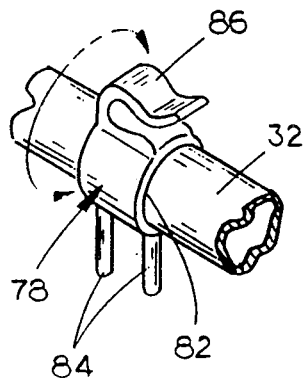
FIG. 4 is a pictorial sectional view taken at lines 4—4 in FIG. 2.
Figure 5:
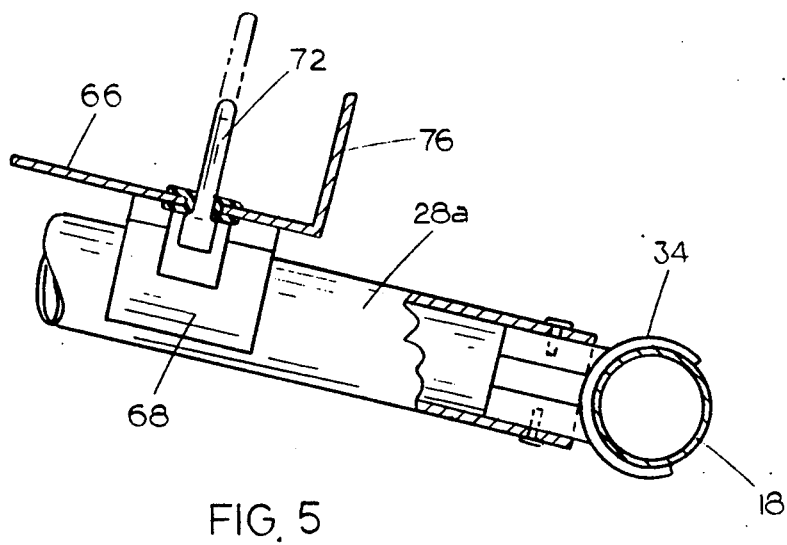
FIG. 5 is a sectional view taken at lines 5—5 in FIG. 2.

In order to maintain a fishing rod in position on fishing rod holder 10, a pair of retention brackets 78 and 80 are connected to base leg 32 of frame 26, as shown in FIGS. 2 and 4. Retention bracket 78 includes a sleeve portion 82 selectively and rotatably mounted on base leg 32, with a pair of spaced apart pegs 84 projecting outwardly therefrom. When sleeve 82 is rotated such that pegs 84 extend upwardly, as shown in FIG. 2, a fishing rod 14 will be retained between the pegs to prevent the rod from falling off of fishing rod holder 10.

Diametric to pegs 84 is a resilient clip 86, mounted on sleeve 82. As shown in FIG. 4, sleeve 82 may be rotated such that clip 86 projects upwardly, so that the fishing rod may be rigidly retained with the clip during transport (as shown in FIG. 7). The second retention bracket 80 is identical to retention bracket 78 and is located to receive a fishing rod connected to band 72.

In order to assist the fisherman in carrying tackle, snacks, beverages or the like, a fabric pouch 88 is suspended from base leg 32 of frame 26. Preferably, pouch 88 extends between legs 40 and 42 of support frame 38 and is adjustably connected thereto to prevent the pouch from excessive swinging during transport.

In operation, fishing rod holder 10 may be connected to the forward legs of a fisherman's chair 12, as shown in FIG. 2. Support frame 38 may then be pivoted away from the chair and locked into the desired position by extensible arm 54. A fishing rod may then be attached to holder 10 by inserting the handle within a band 72 and resting the rod between a pair of pegs on a retention bracket 80. Access to snacks or tackle or the like is simple and easy with pouch 88 suspended on base leg 32 of frame 26.

Once fishing rod holder 10 is connected to a chair 12, the chair and fishing rod holder may be collapsed into a single transportable combination, as shown in FIG. 7. In fact, the fishing rod 14 may be clipped in place on fishing rod holder 10 such that the entire unit may be carried under one arm.

Whereas the invention has been shown and described in connection with the preferred embodiment thereof, it will be understood that many modifications, substitutions and additions may be made which are within the intended broad scope of the appended claims. There has therefore been shown and described an improved fishing rod holder which accomplishes at least all of the above stated objects.

I claim:

1. A fishing rod holder, comprising:

a generally U-shaped first frame means having right and left generally parallel leg members with first and second ends, and a base leg member connecting said first ends of said right and left leg members;

a support frame means having an upper end operably connected to said first frame means and a lower end adapted for ground support;

said support frame means being operably connected to said first frame means so as to selectively support said first frame base member at selective distances above the ground;

fishing rod retaining means connected to said first frame means, for retaining the handle of a fishing rod in position relative to said first frame means;

said support means including right and left leg members having upper and lower ends, the upper ends of said support frame leg members being operably connected to the first frame right and left legs, respectively;

said support frame means further including a base leg member connected between the lower ends of said support frame right and left legs to form a generally U-shaped support frame, such that said support frame right and left legs move in unison;

said right and left support frame legs being rotatably connected to said first frame means, such that said support frame means will rotate about an axis passing between the rotatable connection of said support frame right and left legs to said first frame means;

stop means connected between said support frame means and said first frame means, to prevent rotational movement of the support frame means with respect to the first frame means beyond a predetermined position; and said stop means including a selectively extensible arm member pivotally connected at its lower end to said support frame base leg, and pivotally connected at its upper end to said first frame base leg, said extensible arm member being selectively extensible to retain said first frame base leg at a predetermined distance from the support frame base leg.

2. The fishing rod holder of claim 1, wherein said fishing rod retaining means includes:

a rod support member operably connected between said right and left legs for selective slidable movement therealong; and clamping means connected to said rod support member for retaining said fishing rod handle in position on said support member.

3. The fishing rod holder of claim 2, wherein said clamping means includes a resiliently elastic band connected to the support member to form a stretchable loop adapted to receive said fishing rod handle.

4. The fishing rod holder of claim 1, further comprising at least one guide bracket means connected to said base leg, for guiding a fishing rod supported by said retaining means and for preventing movement of the rod along the longitudinal length of said base leg.

5. The fishing rod holder of claim 1, further comprising at least one clip means connected to said base leg, for selectively retaining a fishing rod.

6. The fishing rod holder of claim 1, further comprising operable attachment means connected to the second ends of said right and left legs, for selective attachment to the legs of a chair, so as to retain said holder relative to said chair.

7. The fishing rod holder of claim 1, wherein said support frame right and left legs are slidably connected to said first frame means to permit slidable movement of the pivotal axis of the support frame legs along said first frame legs.

* * * * *